United States Patent Office 3,336,141
Patented Aug. 15, 1967

3,336,141
NATURAL PIGMENT CONTAINING COLORING
EMULSIONS AND METHODS OF MAKING
Joseph L. Frisina, 850 Howard Ave.,
Staten Island, N.Y. 10303
No Drawing. Filed Oct. 19, 1966, Ser. No. 587,666
16 Claims. (Cl. 99—148)

The present invention relates to coloring emulsions produced from naturally occurring organic materials, and to methods for making such emulsions. More particularly, the present invention relates to coloring emulsions prepared from compositions containing finely ground naturally occurring fruits and vegetables and oleoresins of such fruits and vegetables, and to methods of preparing such emulsions.

The novel coloring compositions of the present invention may be used for many purposes, but they are particularly useful for coloring food. Synthetic coal tar colors have been widely used for food coloring, and while satisfactory from both a color and a cost standpoint, they have been determined to be toxic. Thus there has long been a need in the art for food coloring agents which have the coloring attributes of coal tar derivatives, but which are not toxic. The coloring compositions made in accordance with the present invention possess excellent food coloring properties, and are inexpensive and nontoxic. By following the processes of the present invention it is possible to compare coloring emulsions from naturally occurring fruits, vegetables, etc., which contain natural pigments, that are uniform in color, very stable, and intense in color.

It is commonly known that there are present in certain fruits and vegetables, pigments, which if extracted, can be used to color other materials, and in particular other foods. Prior art food coloring compositions prepared from pigments extracted from naturally occurring fruits and vegetables are subject to several shortcomings. Many of these compositions change color or discolor during normal shelf life; others are expensive, due in part to the fact that it is necessary to heat the compositions during preparation to improve the stability and solubility of the naturally occurring pigments; while others do not have sufficient coloring power for practical economic use. The emulsions of the present invention are subject to none of these deficiencies.

Natural color is commonly extracted from naturally occurring fruits, vegetables, etc., by means of a simple solvent extraction process. The resulting product is commonly designated as an oleoresin of the fruit or vegetable, etc. Depending on the solvents used, the technique employed in the extraction process, and the quality of raw material, the oleoresin may contain a greater or lesser proportion of the coloring matter, essential oils, and other constituents normally present in the fruit or vegetable, etc. One property which is used to indicate the quality of an oleoresin is a rating known as color units or color value, a value obtained colormetrically, using a spectrophotometer or similar color meter by measuring the effective transmission of monochromatic light through a sample liquid. A spectrophotometer contains a source of white light and an optical system capable of separating the light into any wave length of its spectrum. The effective transmission of monochromatic light through a liquid is obtained by interposing the liquid in the light path of the instrument, whereby light of the selected wave length passes through the liquid and strikes a photo-sensitive vacuum tube; the resultant electronic signal is amplified and displayed on an indicator, calibrated in percent transmittance or absorbance.

The sample liquid is prepared by weighing analytically one gram of the oleoresin material into a 100 milliliter volumetric flask, which is then brought up to volume by adding the proper amount of a solvent (such as acetone with paprika, hexane with carrot, distilled water with tomato, etc.), and transferring one milliliter of the liquid thus to a second 100 milliliter volumetric flask, which is brought to volume with additional solvent. The effective transmission of this sample liquid is determined by selecting a particular light wave length, depending on the nature of the oleoresin material of which the color value is being determined (e.g., 460 millimicrons for paprika, 450 millimicrons for carrot, 600 millimicrons for tomato, etc.) and standardizing the spectrophotometer against a reference liquid or "blank," corresponding to the solvent used to prepare the sample liquid (e.g., acetone for paprika, hexane for carrot, distilled water for tomato, etc.). The spectrophotometer is adjusted to read 100 percent transmittance for the reference liquid; a measurement is then taken of the sample liquid, and the value thus obtained, which represents a ratio of the two measurements, is the percent transmittance of the sample liquid. The percent transmittance is interpolated into color values using predetermined standards established in the trade.

The described method for determining the color values of oleoresins may also be used to determine the color values of the finished coloring emulsions of the present invention.

In its broadest aspect, the process of the present invention contemplates a coloring emulsion prepared from a mixture comprising (1) from about 1.5 to about 3.5% by weight of an oleoresin of a naturally occurring organic material which contains natural coloring, (2) from about 15.5 to about 31% by weight of an edible organic solvent, (3) from about 55 to about 77% by weight water, (4) from about 4 to about 16% by weight of a finely ground naturally occurring organic material which contains natural coloring matter, the finely ground material being the same species of naturally occurring organic material as that from which the oleoresin was derived, and (5) a minor amount (up to 0.05%) of a chelating agent.

The coloring emulsions of the present invention may not be prepared by merely mixing all of the ingredients of the emulsion together, rather to obtain the desired coloring emulsion, it is essential that the ingredients be combined in a particular manner. Specifically, the coloring emulsions of the present invention are prepared by:

(1) combining (a) a viscous solution of from about 85.75 to about 93.75% by weight of an edible organic solvent and from about 6.25 to about 14.25% by weight of an oleoresin of a naturally occurring organic material which contains natural coloring matter and
(b) a solution of a minor amount, i.e., from about 0.001 to about 0.05% by weight, of a chelating agent in water, (2) adding to this combination, while substantially continuously agitating, finely ground naturally occurring organic material which contains natural coloring matter, (a) said finely ground material being of the same species of naturally occurring organic material as that from which the oleoresin was derived, (b) the relative proportions of the viscous oleoresin solution, the chelating agent solution, and the finely ground material being selected so that the final mixture contains from about 17 to about 34% by weight of the oleoresin solution, from about 55 to about 77% of the chelating agents solution, and from about 4 to about 16% by weight of the finely ground material, (3) subjecting the resultant mixture to shearing forces for a sufficient period of time for the particles of the finely ground naturally occurring material and the oleoresin to be reduced to colloidal size, whereby a stable emulsion is formed.

A preferred embodiment of the process of the present invention involves producing a coloring emulsion from naturally occurring organic materials which contain natural coloring matter comprising:

(1) preparing a premix viscous solution of from about 85.75 to about 93.75% by weight of an edible organic solvent and from about 6.25 to about 14.25% by weight of an oleoresin of a naturally occurring organic material which contains natural coloring matter, (2) preparing a premix solution of water and a minor amount, i.e., from about 0.001 to about 0.05% by weight, of a chelating agent, (3) combining the premix viscous oleoresin solution and the premix chelating agent solution, (4) adding to this combination, while substantially continuously agitating, finely ground naturally occurring organic material which contains natural coloring matter, (a) said finely ground material being the same species of naturally occurring organic material as that from which the oleoresin was derived, (b) the relative proportions of the premix viscous oleoresin solution, the premix chelating agent solution, and finely ground material being selected so that the final mixture contains from about 17 to about 34% by weight of the premix oleoresin solution, from about 55 to about 77% by weight of the premix chelating agent solution and from about 4 to about 16% by weight of the finely ground material, and (5) subjecting the resultant mixture to shearing forces, for a sufficient period of time for the particles of the finely ground naturally occurring material and the oleoresin to be reduced to colloidal size, whereby a stable emulsion is formed.

It will, of course, be appreciated, that in practicing the preferred embodiment of the process of the present invention, there is no criticallity with respect to which premix solution is first prepared. It does not matter whether the premix viscous oleoresin solution is prepared first, or whether the premix chelating agent solution is prepared first.

The present invention also contemplates a coloring emulsion comprising (1) from about 15.5 to about 31% by weight of an edible organic solvent, (2) from about 1.5 to about 3.5% by weight of an oleoresin of a naturally occurring organic material which contains natural coloring matter, (3) from about 55 to about 77% by weight of water, (4) a minor amount of a chelating agent, i.e., less than 0.05% by weight, and (5) from about 14 to about 16% by weight of a colloidal size naturally occurring organic material which contains natural coloring matter, the colloidal size material being the same species of naturally occurring organic material as that from which the oleoresin was derived.

In preparing the premix viscous oleoresin solution required in the process of the present invention, from about 6.25 to about 14.25% by weight of an oleoresin is mixed with from about 85.75 to about 93.75% by weight of an edible organic solvent, the percentages of both ingredients based on the total weight of the premix viscous oleoresin solution, and agitated with a lightning type mixer until the combination is uniform in texture.

In preparing the premix oleoresin solution, it is preferred to use an oleoresin that has the highest commercially available color value. However, this is merely a preferred embodiment of the present invention. For example, if the naturally occurring organic material is paprika, an oleoresin of paprika with the color value of about 120,000 is available, while an oleoresin of paprika with a color value as low as 3,000 may be used.

Other nonlimiting examples, in addition to paprika, of oleoresins suitable for use in the present invention include the oleoresins of annatto, beets, carrots, sweet potatoes, tomatoes, saffron, and blueberries.

Suitable nonlimiting examples of edible organic solvents include cottonseed oil, mineral oil, vegetable oil, animal oil, and polyhydric alcohols such as glycerine and propylene glycol. Glycerine and propylene glycol are preferred.

The premix chelating agent solution of the preferred process of the present invention is prepared by merely dissolving a minor amount of a chelating agent in water. Preferably, the water is heated slightly, as to about 100° F., and from about 0.001 to about 0.05% by weight of the chelating agent is dissolved in the water. Examples of suitable chelating agents are the disodium salt of ethylene diamine tetra acetic acid, citric acid, ascorbic acid, and the calcium salt of ethylene diamine tetra acetic acid. The disodium salt of ethylene diamine tetra acetic acid is preferred.

The finely ground naturally occurring organic material which contains natural coloring matter, preferably, paprika, annatto, carrots, sweet potatoes, beets, tomatoes, saffron, or blueberries, may be prepared by any of the numerous grinding methods known in the art, as for example, processing through a hammer mill. Preferably, the naturally occurring organic material is ground until it has a particle size of about 149 microns to about 250 microns.

The mixture of the premix slurry, the premix solution, and the finely ground naturally occurring organic material are subjected to shearing force by employing methods and apparatus, such as colloid mills or stone mills, well known in the art.

The following example is given to illustrate the invention; it is merely examplary and is in on way limiting.

EXAMPLE

A premix viscous solution was prepared by mixing 21 pounds of propylene glycol with 2.5 pounds of oleoresin of paprika having a 100,000 color value. Thus, the resultant viscous solution contained about 89% by weight propylene glycol and 11% by weight oleoresin, based on the total weight of the resultant slurry. This combination was agitated with a lightning mixer until a uniform texture was obtained.

A premix solution was prepared by adding 0.03% of the disodium salt of ethylene diamine tetra acetic acid to 70 pounds of water at 100° F.

The premix viscous oleoresin solution and the premix chelating agent solution were mixed together and, while continuously agitating, 6.5 pounds of paprika, previously ground in a hammer mill to a particle size of from about 149 microns to about 250 microns, was added. The mixture was agitated until it was uniform and free from lumps.

The entire mixture was then treated with a stone mill for a sufficient time for the ground paprika and oleoresin paprika to be reduced to colloidal size, and for a stable emulsion to form.

The resultant emulsion is an intense red color and is very suitable for coloring such food products as soups, gravies, salad dressing, etc. The coloring emulsion thus prepared, i.e., an amulsion comprising about 21% by weight propylene glycol, about 2.5% by weight of an oleoresin of paprika having about a 100,000 color value, about 70% by weight water, about 6.5% by weight paprika, and a minor amount, i.e., less than 0.05%, of the disodium salt of ethylene diamine tetra acetic acid, represents a preferred embodiment of coloring emulsions of the present invention.

Numerous naturally occurring organic materials which contain natural coloring matters are useful in the process of the present invention. Preferred natural fruits, vegetables, etc., include:

*Annatto.*—The seed of the small tree, *Bixa orellana L., bixaceae,* of tropical America. The seeds contain a natural yellowish-red vegetable pigment bixin, characterized by a high degree of coloring power, useful for coloring dairy products, including oleomargarine, chicken, and rice. The natural pigment obtained from annatto seeds is also used for coloring fabrics and in paints.

*Beet.*—Any of the various biennial plants of the chenopodiaceous family, genus beta, including the red beet, the root of which contains the red-violet and yellow naturally occurring pigments, betacyanins and betoxanthins.

*Carrot.*—A well known plant of the Umbelliferous genus Daucus, especially *D. carota,* which the industrially important yellow coloring material carotene, particularly beta-carotene, is derived.

*Sweet potato.*—The edible tuber of a well known cultivated plant, *Ipomoea batates,* from which a yellow-orange natural coloring material may be derived.

*Paprika.*—The dried fruit of a cultivated form of *Capsicum annuum L., solanaceae,* from which the deep red carotenoid pigment, capsanthin is derived.

*Tomato.*—A well known widely cultivated solanaceous plant *Lycopersicon esculentum,* usually red, but sometimes yellow, containing lycopene as the main naturally occurring pigment.

*Saffron.*—A crocus, *Crocus sativus L., dridaceae* with purple flowers, from the dried stigmas of which an orange coloring material, crocin, may be derived. This natural pigment is commonly used for coloring confectionaries, chicken dishes, rice, rolls and buns.

As would be expected, the coloring emulsions prepared from the above naturally occurring fruits, vegetables, etc., are of the same color as the natural coloring matter contained in the fruits, vegetables, etc.

In addition to the above mentioned specific examples, natural pigments such as chlorophylls, carotenoids, and occasionally flavonoids may be obtained from green vegetables; natural pigments such as carotenoids, betacyanins, anthocyanins, and flavonoids may be obtained from various root vegetables; while natural pigments such as carotenoids, anthocyanins, and flavonoids, etc., may be obtained from various fruits.

The products of the present invention are particularly useful in the manufacture of soups, gravies, bakery products, canned foods, frozen foods, meat and fish products, etc., where natural coloring agents are desired.

What is claimed is:
1. The method of producing a coloring emulsion from naturally occurring organic materials which contain natural coloring matter comprising:
 (A) combining
  (1) a viscous solution comprising from about 85.75 to about 93.75% by weight of an edible organic solvent and from about 6.25 to about 14.25% by weight of an oleoresin of a naturally occurring organic material which contains natural coloring matter, and
  (2) a solution comprising water and a minor amount of a chelating agent;
 (B) adding to the combined viscous oleoresin solution and chelating agent solution, with substantially continuous agitation, a finely ground naturally occurring organic material which contains natural coloring matter
  (1) said finely ground material being the same species of naturally occurring organic material as that from which the oleoresin of the viscous oleoresin solution is derived
  (2) the relative proportions of the viscous oleoresin solution, the chelating agent solution, and the finely ground naturally occurring organic material being selected so that the final mixture contains from about 17 to about 34% by weight of the viscous oleoresin solution, from about 55 to 77% by weight of the chelating agent solution, and from about 4 to about 16% by weight of finely ground material; and
 (C) subjecting the resultant mixture to shearing forces for a sufficient period of time for the particles of the finely ground material and the oleoresin to be reduced to a colloidal size, whereby a stable emulsion is formed.

2. The method of claim 1 in which said finely ground naturally occurring organic material is selected from the group consisting of paprika, annatto, carrots, sweet potatoes, tomatoes, saffron and blueberries.

3. The method of claim 1 in which said finely ground naturally occurring organic material is paprika.

4. The method of claim 1 in which said edible organic solvent is selected from the group consisting of cottonseed oil, mineral oil, vegetable oil, animal oil, propylene glycol, and glycerine.

5. The method of claim 1 in which said edible organic solvent is propylene glycol.

6. The method of claim 1 in which said chelating agent is selected from the group of the disodium salt of ethylene diamine tetra acetic acid, citric acid, ascorbic acid, and the calcium salt of ethylene diamine tetra acetic acid.

7. The method of claim 1 in which said chelating agent is the disodium salt of ethylene diamine tetra acetic acid.

8. The method of claim 1 in which said finely ground naturally occurring organic material is rdeuced to colloidal size by means of a stone mill.

9. A coloring emulsion comprising:
 (A) from about 15.5 to about 31% by weight of an edible organic solvent;
 (B) from about 1.5 to about 3.5% by weight of an oleoresin of a naturally occurring organic material which contains natural coloring matter;
 (C) from about 55 to about 77% by weight water;
 (D) a minor amount of a chelating agent; and
 (E) from about 4 to about 16% by weight colloidal size naturally occurring organic material which contains natural coloring matter, said colloidal size material being the same species of naturally occurring organic material as that from which said oleoresin was derived.

10. The composition of claim 9 in which said finely ground naturally occurring organic material is selected from the group consisting of paprika, annatto, carrots, sweet potatoes, tomatoes, saffron and blueberries.

11. The composition of claim 9 in which said finely ground naturally occurring organic material is paprika.

12. The composition of claim 9 in which said edible organic solvent is selected from the group consisting of cottonseed oil, mineral oil, vegetable oil, animal oil, propylene glycol, and glycerine.

13. The composition of claim 9 in which said edible organic solvent is propylene glycol.

14. The composition of claim 9 in which said chelating agent is selected from the group of the disodium salt of ethylene diamine tetra acetic acid, citric acid, ascorbic acid, and the calcium salt of ethylene diamine tetra acetic acid.

15. The composition of claim 9 in which said chelating agent is the disodium salt of ethylene diamine tetra acetic acid.

16. A coloring emulsion comprising:
(A) about 21% by weight propylene glycol;
(B) about 2.5% by weight of an oleoresin of paprika having a 100,000 color value;
(C) about 70% by weight water;
(D) a minor amount of the disodium salt of ethylene diamine tetra acetic acid; and
(E) about 6.5% by weight colloidal size paprika.

References Cited

UNITED STATES PATENTS

| | | | |
|---|---|---|---|
| 2,384,532 | 9/1945 | Bush et al. | 99—140 |
| 3,245,805 | 4/1966 | O'Neil et al. | 99—148 X |

A. LOUIS MONACELL, *Primary Examiner.*

H. H. KLARE, *Assisant Examiner.*